(12) United States Patent  
Haunhorst

(10) Patent No.: US 8,132,781 B2
(45) Date of Patent: Mar. 13, 2012

(54) INTERLOCK SYSTEM FOR VALVE COUPLING

(75) Inventor: Gregory A. Haunhorst, Monclova, OH (US)

(73) Assignee: Eaton Corporation, Cleveland, OH (US)

( * ) Notice: Subject to any disclaimer, the term of this patent is extended or adjusted under 35 U.S.C. 154(b) by 396 days.

(21) Appl. No.: 12/431,432

(22) Filed: Apr. 28, 2009

(65) Prior Publication Data

US 2010/0269933 A1  Oct. 28, 2010

(51) Int. Cl.
 *F16K 51/00* (2006.01)
(52) U.S. Cl. ................................ 251/149.9; 137/614.06
(58) Field of Classification Search .............. 251/149.1, 251/149.9; 137/614.06
 See application file for complete search history.

(56) References Cited

U.S. PATENT DOCUMENTS

| 2,872,216 | A | * | 2/1959 | Kaiser .................... 137/637.05 |
| 3,159,180 | A | * | 12/1964 | Courtot et al. ........... 137/614.06 |
| 3,479,005 | A | | 11/1969 | De Graaf |
| 4,438,779 | A | | 3/1984 | Allread |
| 5,099,883 | A | | 3/1992 | Maiville |
| 5,332,001 | A | | 7/1994 | Brown |
| 5,488,972 | A | | 2/1996 | McCracken et al. |
| 5,595,217 | A | | 1/1997 | Gillen et al. |
| 6,056,011 | A | * | 5/2000 | Bormioli .................. 137/614.06 |
| 6,298,876 | B1 | * | 10/2001 | Bogdonoff et al. ...... 137/614.06 |

FOREIGN PATENT DOCUMENTS

| DE | 20314197 U1 | 11/2003 |
| WO | 93/25838 A1 | 12/1993 |

* cited by examiner

*Primary Examiner* — John Fristoe, Jr.
(74) *Attorney, Agent, or Firm* — Quinn Law Group, PLLC

(57) ABSTRACT

A fluid coupling includes a body defining a passageway, a valve member that is selectively movable between a closed position and an open position, and an interface at which the body is connectable to a complementary coupling. An interlock system is configured to permit movement of the valve member from the closed position to the open position when the complementary coupling is connected to the body at the interface, and to prevent movement of the valve member from the closed position to the open position when the complementary coupling is not connected to the body at the interface.

11 Claims, 4 Drawing Sheets

US 8,132,781 B2

INTERLOCK SYSTEM FOR VALVE COUPLING

TECHNICAL FIELD

This invention relates to valve couplings.

BACKGROUND OF THE INVENTION

Fluid couplings provide sealed fluid communication between two fluid passageways, such as those defined by hoses, tubes, etc. Some couplings include valves that selectively obstruct fluid communication to prevent fluid flow through the coupling when the coupling is not engaged with a complementary coupling, thereby to avoid unwanted fluid spillage.

SUMMARY OF THE INVENTION

A fluid coupling includes a body defining a passageway. A valve member is selectively movable between a closed position in which the valve member obstructs the passageway and an open position in which the valve member does not obstruct the passageway. The coupling includes an interface at which the body is connectable to a complementary coupling thereby to provide sealed fluid communication between the passageway and another passageway defined by the complementary coupling. The coupling further includes an interlock system that permits movement of the valve member from the closed position to the open position when the complementary coupling is connected to the body at the interface. The interlock system prevents movement of the valve member from the closed position to the open position when the complementary coupling is not connected to the body at the interface.

Accordingly, the coupling provided herein prevents or minimizes the possibility of an unintentional opening of the valve when the coupling is not connected to a complementary coupling.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
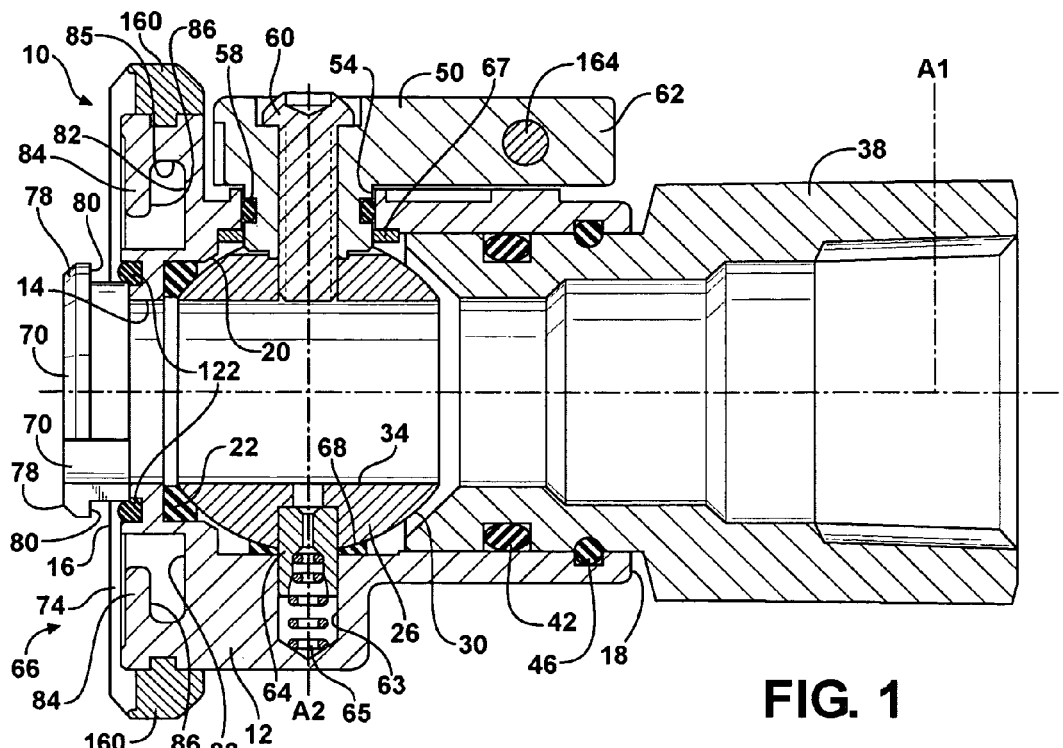
FIG. 1 is a schematic, partial cross-sectional side view of a coupling with a valve in an open position.

Referring to FIG. 1, a coupling 10 includes a body 12 defining a passage 14 that extends from a first end 16 of the body 12 to a second end 18 of the body 12. The body 10 also defines an annular valve seat 20 and a seal ring 22. The valve seat 20 and the seal ring 22 are concentric with the passage 14 about axis A1. A ball valve 26 is rotatably mounted within the passage 14 and includes a spherical exterior surface 30 and a diametrical bore 34 which extends therethrough. The valve seat 20 and seal 22 engage the ball valve surface 30.

An annular adapter extension 38, which may be mounted upon a hose, or other conduit component of the fluid circuit, not shown, extends into the passage 14 and is sealed with respect thereto by O-ring 42. The adapter 38 is maintained within body 12 by a drive wire 46 received within aligned grooves wherein rotation of the body 12 relative to the adapter 38 is possible.

Figure 2:
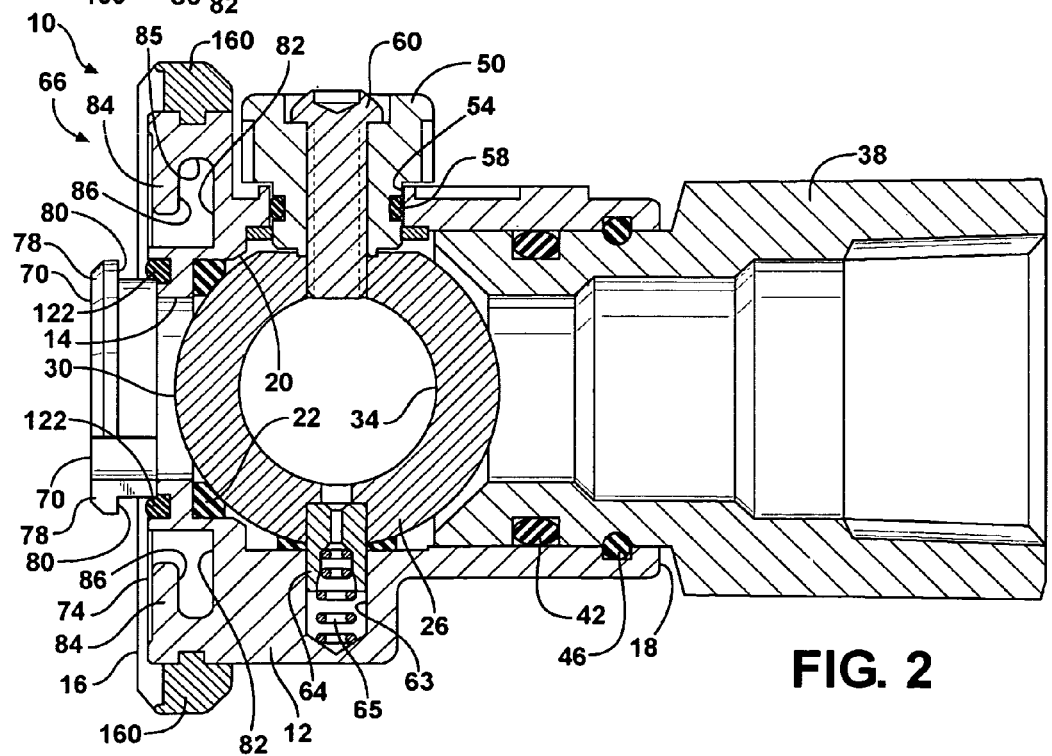
FIG. 2 is a schematic, partial cross-sectional side of the coupling of FIG. 1 with the valve in a closed position.

The valve 26 is selectively rotatable about axis A2 between an open position, as shown in FIG. 1, and a closed position, as shown in FIG. 2. Axis A2 is perpendicular to, and intersects, axis A1. Referring to FIG. 2, the valve 26 is within the passage 14. When the valve 26 is in the closed position, surface 30 of the valve cooperates with the seat 20 and seal ring 22 to completely obstruct the passage 14, thereby preventing fluid communication through the passage 14 from the first end 16 of the body to the second end 18 of the body. Referring again to FIG. 1, when the valve 26 is in the open position, the bore 34 is coaxially aligned with the passage 14 and permits fluid communication therethrough.

An actuator 50 extends through a bore 54 defined in the wall of the body 12 and is sealed with respect thereto by seal 58. The actuator 50 is rigidly connected to the valve 26 for rotation therewith about axis A2 by a screw 60. The actuator 50 includes a handle portion 62 disposed adjacent the exterior surface of the body 12 as to be exteriorly accessible. Accordingly, rotation of the handle portion 62 about axis A2 causes the movement of the valve 26 between the open and closed positions.

The body 12 defines a hole 63 that is across the passage 14 from bore 54. A pivot pin 64 extends into the hole 63 and is operatively connected to the valve 26. Thus, the pivot pin 64 cooperates with the actuator 50 and screw 60 to maintain the axial position of the valve 26 along axis A1 while permitting rotation of the valve 26 about axis A2. A spring 65 inside hole 63 urges the pin 64 upward (as seen in FIG. 1), which facilitates assembly of the valve 26 into the body 12. The coupling 10 includes two polymeric washers 67, 68 that separate the body 12 from the valve 26 to reduce friction therebetween during rotation of the valve 26 about axis A2. Exemplary materials for the washers 67, 68 include nylon and polytetrafluoroethylene.

Figure 3:
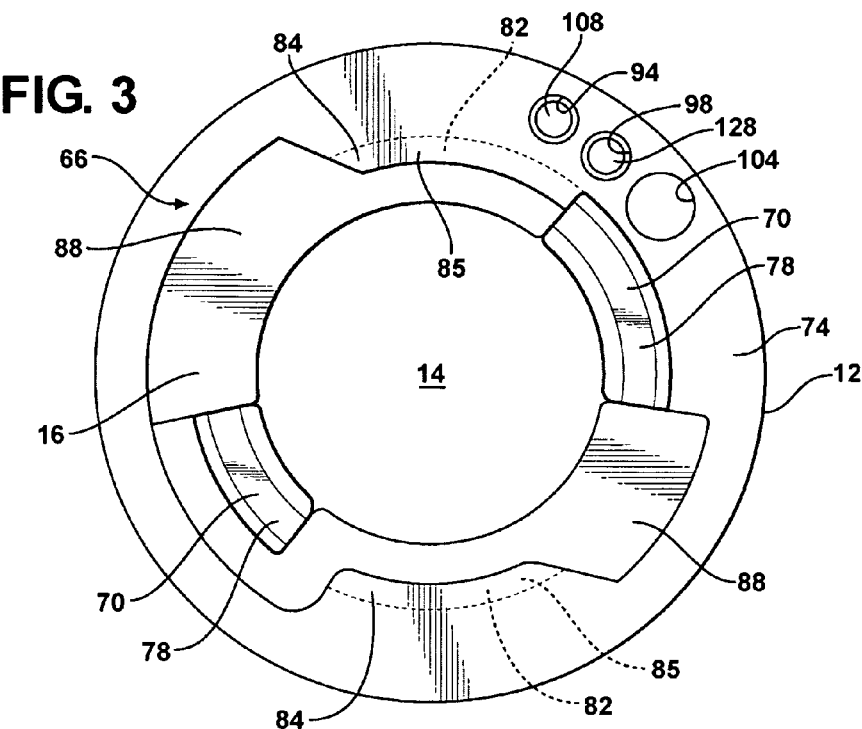
FIG. 3 is a schematic end view of the coupling of FIG. 1.

Referring to FIGS. 1-3, the coupling 10 defines an interface 66 at which another coupling (shown at 10A in FIG. 5) is matable with the coupling 10. The interface 66 includes a pair of arcuate projections 70 extending from the body flat sealing surface 74 defined at the end 16 of the body 12 perpendicular to the axis A1. Each of the projections 70 includes a respective head or knob 78. Each knob 78 defines a radial surface 80 that faces sealing surface 74.

The interface 66 also includes a pair of arcuate grooves 82 formed in surface 74. Each groove 82 cooperates with a respective lip 84 to define a respective slot 85. Each lip 84 defines a respective radial surface 86. Each groove 82 also includes a respective enlarged access opening 88. More particularly, the access openings 88 are portions of the grooves 82 in surface 74 unobstructed by a respective lip 84. The projections 70 and the grooves 82 are concentrical about axis A1. The body 12 defines three bored holes 94, 98, 104 in sealing surface 74 that extend parallel to axis A1.

Figure 4:
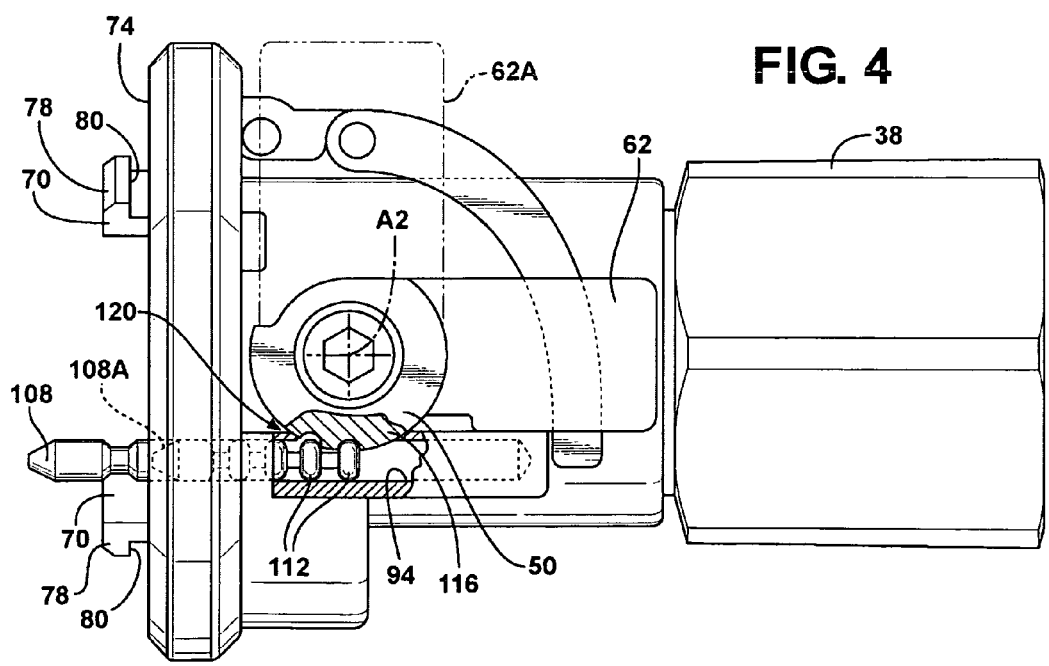
FIG. 4 is a schematic side view of the coupling of FIG. 1.

Referring to FIG. 4, the actuator 50 is mounted to the valve (shown at 26 in FIGS. 1 and 2) such that, when the handle 62 of the actuator 50 is in the position shown in phantom at 62A, the valve 26 is in its closed position. When the actuator handle 62 is in the position shown at 62, the valve 26 is in its open position. Thus, rotation of the handle with respect to the body 12 about axis A2 between the positions shown at 62A and 62 causes movement of the valve 26 between its open and closed positions.

A pin 108 is disposed within bore 94. The pin 108 is selectively translatable within the bore 94, in a direction parallel with axis A1, between an extended position, as shown at 108, and a retracted position, as shown in phantom at 108A. One end of the pin 108 includes a plurality of teeth 112. The actuator 50 includes a gear portion 116 having teeth 120 in meshing engagement with the teeth 112 of the pin 108 so that rotation of the actuator 50 about axis A2 causes the translation of the pin 108 inside the bore 94.

More specifically, the pin 108 is connected to the actuator 50 (including the handle 62) via teeth 112, 120 such that the pin 108 is in its extended position when the handle is in the position shown at 62, and the pin is in its retracted position (shown at 108A) when the handle is in the position shown at 62A. Accordingly, the pin 108 is mechanically coupled to the valve 26 such that the pin is in its extended position when the valve 26 is in its open position, and the pin 108 is in its retracted position when the valve 26 is in its closed position.

Figure 5:
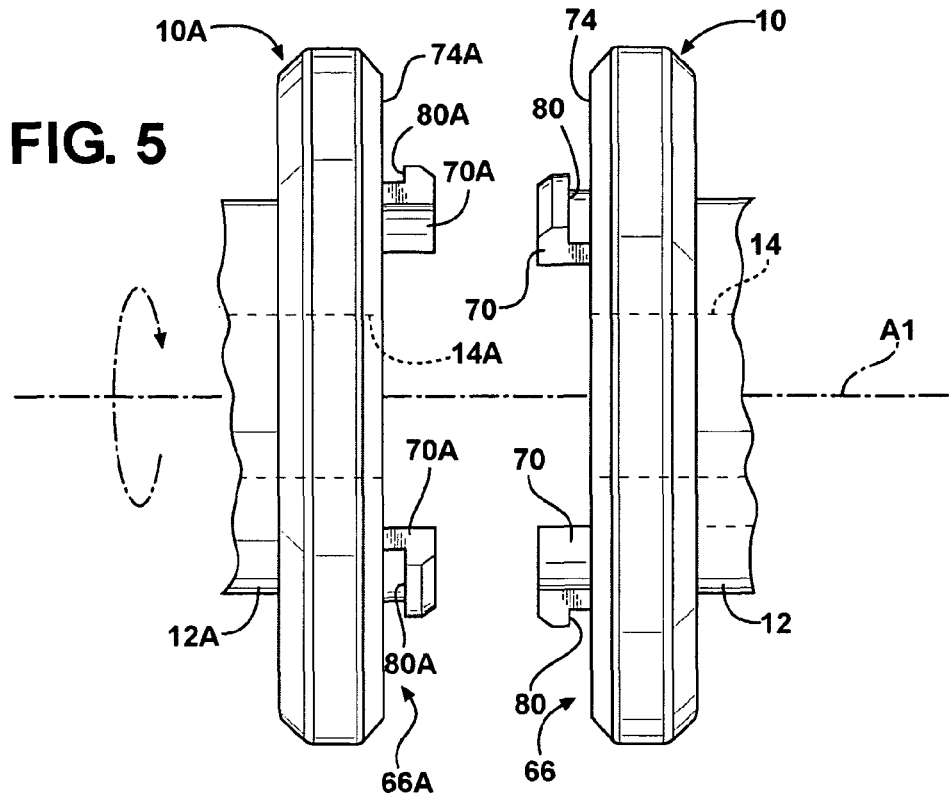
FIG. 5 is a schematic side view of the coupling of FIG. 1 engaging a complementary coupling.

Referring to FIG. 5, wherein like reference numbers refer to like components from FIGS. 1-4, the coupling 10 is matable with another coupling 10A. Coupling 10A is identical to coupling 10. Thus, coupling 10A includes an interface 66A that is identical to interface 66. Interface 66A includes a sealing surface 74A identical to sealing surface 74, and arcuate projections 70A identical to arcuate projections 70. Sealing surface 74A includes grooves (not shown), lips (not shown) that define radial surface (not shown), and enlarged access openings (not shown) that are identical to the grooves 82, lips 84, radial surfaces 86, and enlarged access openings 88, respectively, of the sealing surface 74 of coupling 10.

Coupling 10A also includes a passage 14A that extends from sealing surface 74A. To connect couplings 10 and 10A to each other about axis A1 so that passage 14 and passage 14A are in sealed fluid communication with one another, the bodies 12, 12A are aligned such that the axis of passages 14A is coextensive with axis A1. The bodies 12, 12A are then rotated relative to each other such that each projection 70A in the interface 66A aligns with a respective access opening (shown at 88 in FIGS. 1-3) of interface 66, and each projection 70 of interface 66 aligns with a respective access opening (not shown) of interface 66A.

Upon this alignment being achieved the bodies 12 and 12A are axially moved toward each other and rotated relative to each other causing each radial surface 80A of body 12A to engage a respective slot surface 86 on body 12, and each radial surface 80 on body 12 to engage a respective slot surface (not shown) on body 12A. The radial surfaces 80, 86 may be inclined in a slight helical configuration to "draw" the body sealing surfaces 74, 74A toward each other. Seals (shown at 122 in FIGS. 1 and 2) will engage and be deformed during coupling, producing a fluid tight seal between the couplings 10, 10A and providing fluid communication between passages 14 and 14A. Referring to FIG. 1, seal 122 is annular and circumscribes the opening of passage 14, and engages the corresponding seal on coupling 10A. Seal 122 is shown having a solid cross-section. Other cross-sectional shapes and configurations may be employed within the scope of the claimed invention. For example, in one exemplary embodiment, seal 122 has a U-shaped cross-sectional shape.

Figure 6:
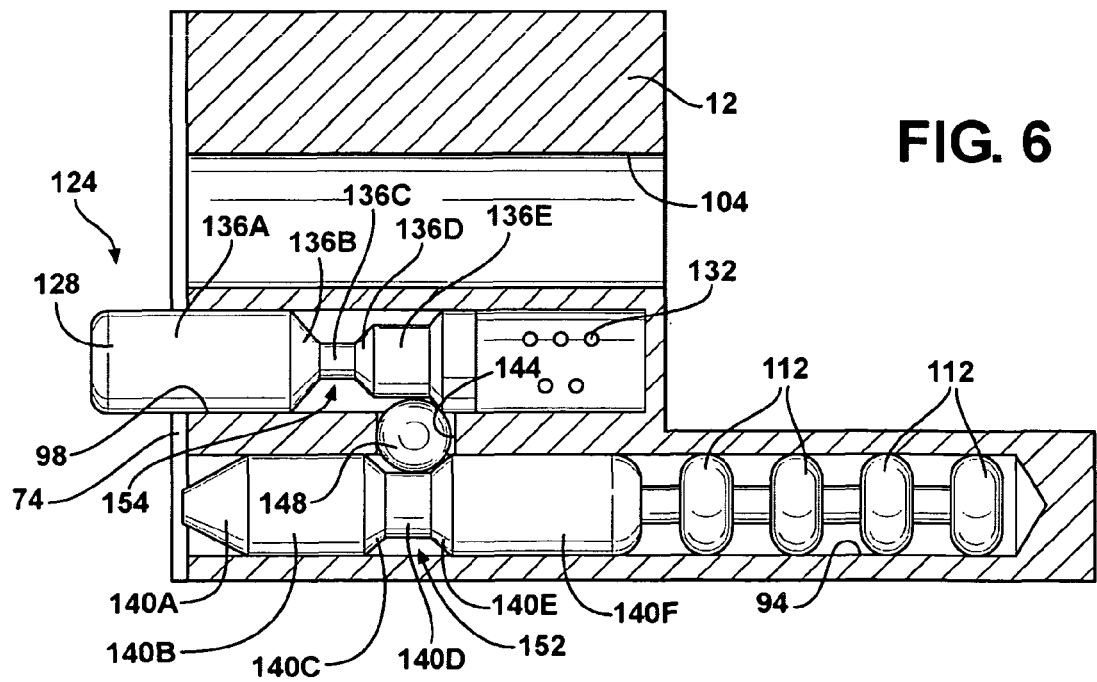
FIG. 6 is a schematic, cross sectional side view of an interlock system of the coupling of FIG. 1 when the valve is closed and the coupling is not attached to the complementary coupling.

Referring to FIG. 6, the coupling 10 includes an interlock system 124 that permits movement of the valve (shown at 26 in FIGS. 1 and 2) from the closed position to the open position when the complementary coupling 10A is connected to the body 12 at the interface 66, and that prevents movement of the valve member 26 from the closed position to the open position when the complementary coupling 10A is not connected to the body 12 at the interface 66.

Figure 7:
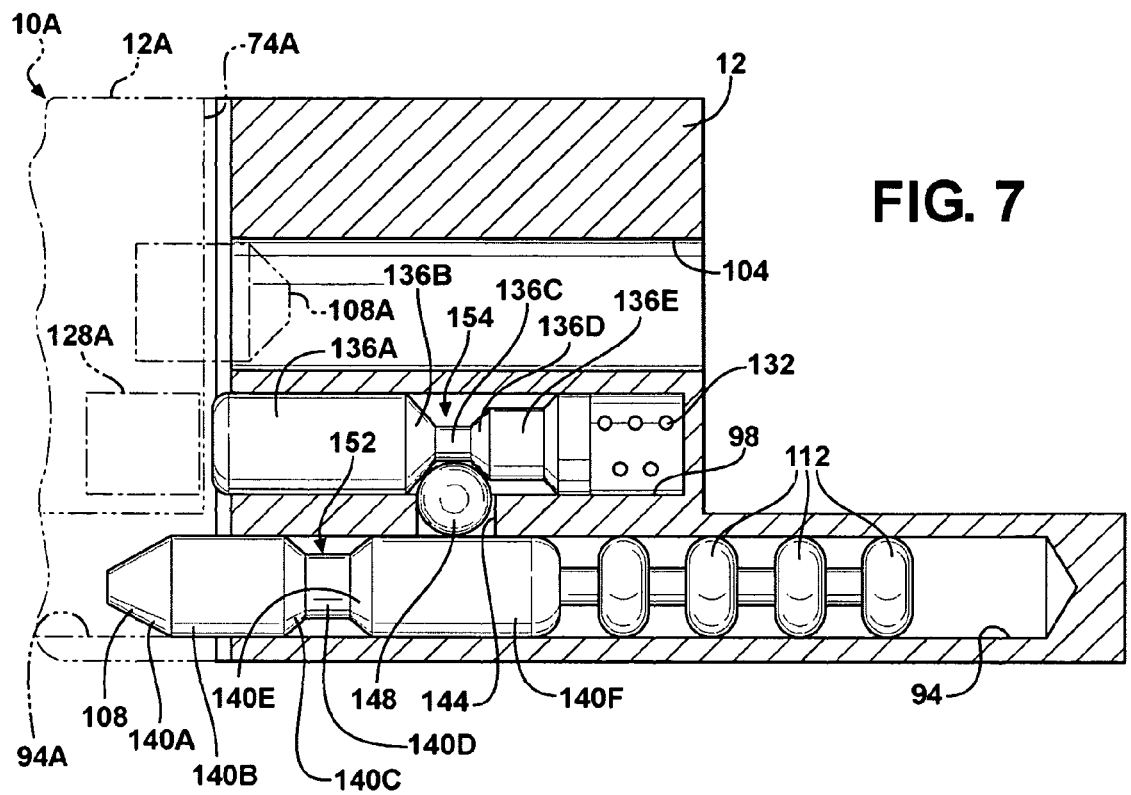
FIG. 7 is a schematic, cross section side view of the interlock system of FIG. 6 when the valve is open and the coupling is attached to the complementary coupling.

More specifically, the interlock system 124 includes an interlock member, which, in the embodiment depicted, is pin 128. The pin 128 is disposed within the hole 98 and is selectively movable with the hole 98 between a first position, as shown in FIG. 6, and a second position, as shown in FIG. 7. The pin 128 protrudes out of the hole 98 from surface 74 in the first position, and is substantially entirely contained within the hole 98 in the second position. A spring 132 biases the pin 128 in its first position.

The pin 128 is tapered at various segments along its length. More specifically, the pin 128 includes segments 136A-E. The diameter of segment 136C is less than the diameters of segments 136A and 136E, and thus segment 136C is a locally narrowed portion of the pin 128. Segment 136B interconnects segments 136A and 136C, and defines a ramp having a diameter that varies. Similarly, segment 136D interconnects segments 136C and 136E, and defines a ramp having a diameter that varies.

Pin 108 is tapered at various segments along its length. More specifically, the pin 108 includes segments 140A-F. Segment 140A defines a tapered tip of the pin 108. The diameter of segment 140D is less than the diameters of segments 140B and 140F, and thus segment 140C is a locally narrowed portion of the pin 108. Segment 140C interconnects segments 140B and 140D, and defines a ramp having a diameter that varies. Similarly, segment 140E interconnects segments 140D and 140F, and defines a ramp having a diameter that varies.

The body 12 defines an opening 144 between the holes 94 and 98. A locking member, namely roller element 148, is disposed within the opening 144. The pin 108 is configured such that segment 140D is aligned with the opening 144 when the pin 108 is in the retracted position, as shown in FIG. 6. Pin 128 is configured such that segment 136E is aligned with the opening 144 when the pin 128 is in the first position, as shown in FIG. 6. Thus, with pin 108 in the retracted position and pin 128 in its first position, the roller element 148 is partially located within the groove 152 defined by segments 140C, 140D, and 140E of pin 108, and is in contact with segment 136E of pin 128.

When the pin 108 is in the extended position, as shown in FIG. 7, segment 140F of pin 128 is aligned with the opening 144, and thus the roller element 148 contacts segment 140F. Accordingly, movement of the pin 108 from the retracted position to the extended position requires movement of the roller element 148 into hole 98 by a distance that is equal to the difference between the radii of segments 140D and 140F. However, as show in FIG. 6, when segment 136E of pin 128 is aligned with opening 144, segment 136E prevents such movement of the roller element 148.

More specifically, segment 140E urges the roller element 148 toward hole 98 as pin 108 is moved to its extended position; however, segment 136E of pin 128 is sufficiently wide to prevent adequate movement of the roller 148 to permit the roller element 148 to clear segment 140E. Accordingly, when pin 128 is in the first position, pin 108 is locked in its retracted position, and, therefore, the valve 26 is locked in its closed position.

Referring to FIG. 7, when coupling 10A is connected to body 12 at interface 66, pin 128A of coupling 10A acts on the pin 128 to maintain the pin 128 in its second position. When the pin 128 is in the second position, segment 136C is aligned with the hole 144. The groove 154 defined by segments 136B, 136C, and 136D permits movement of the roller element 148 into hole 98, and therefore pin 108 is movable from the retracted position to the extended position.

The interlock system 124 is thus configured to prevent movement of the pin 108 from its retracted position to its extended position when the complementary coupling 10A in not engaged with interface 66, i.e., when pin 128 is in its first position, and is configured to permit movement of the pin 108 from its retracted position to its extended position when the complementary coupling 10A is engaged with interface 66, i.e., when pin 128 is in its second position. The pin 108 is mechanically coupled to the valve 26 so that the valve 26 is in the open position when the pin 108 is in the extended position and the valve 26 is in the closed position when the pin 108 is in the retracted position. Therefore, interlock system 124 is configured to prevent movement of the valve 26 from its closed position to its open position when the complementary coupling 10A is not engaged with interface 66, i.e., when pin 128 is in its first position, and is configured to permit movement of the valve 26 from its closed position to its open position when the complementary coupling 10A is engaged with interface 66, i.e., when pin 128 is in its second position.

When the pin 108 is in its extended position, it extends into bore 104A of coupling 10A, thereby preventing rotation of couplings 10, 10A relative to each other about axis A1 when the valve 26 is in the open position. Rotation of the valves 10, 10A relative to each other is necessary to decouple coupling 10A from coupling 10, and thus the pin 108 in the extended position prevents decoupling of the couplings 10, 10A when the valve 26 is open. Similarly, pin 108A of coupling 10A extends into hole 104 of body 12 when the valve (not shown) of coupling 10A is in the open position. Thus, to disconnect the couplings 10, 10A, the valves of each coupling must be in their closed positions.

Referring again to FIGS. 1 and 2, coupling 10 includes an annular bumper 160 that circumscribes at least part of the interface 66. The bumper 160 protects the coupling 10 if the coupling 10 is dropped or dragged. The bumper 160 also acts as a dust seal when the coupling 10 is operatively connected to the complementary coupling 10A. The bumper 160 is comprised of an elastomeric material such as neoprene.

In the embodiment depicted, a depressible button 164 is mounted to the handle 62. A second interlock system (not shown) prevents rotation of the actuator 50 and valve 26 unless the button 164 is depressed, thereby further preventing unintentional movement of the valve 26.

Figure 8:
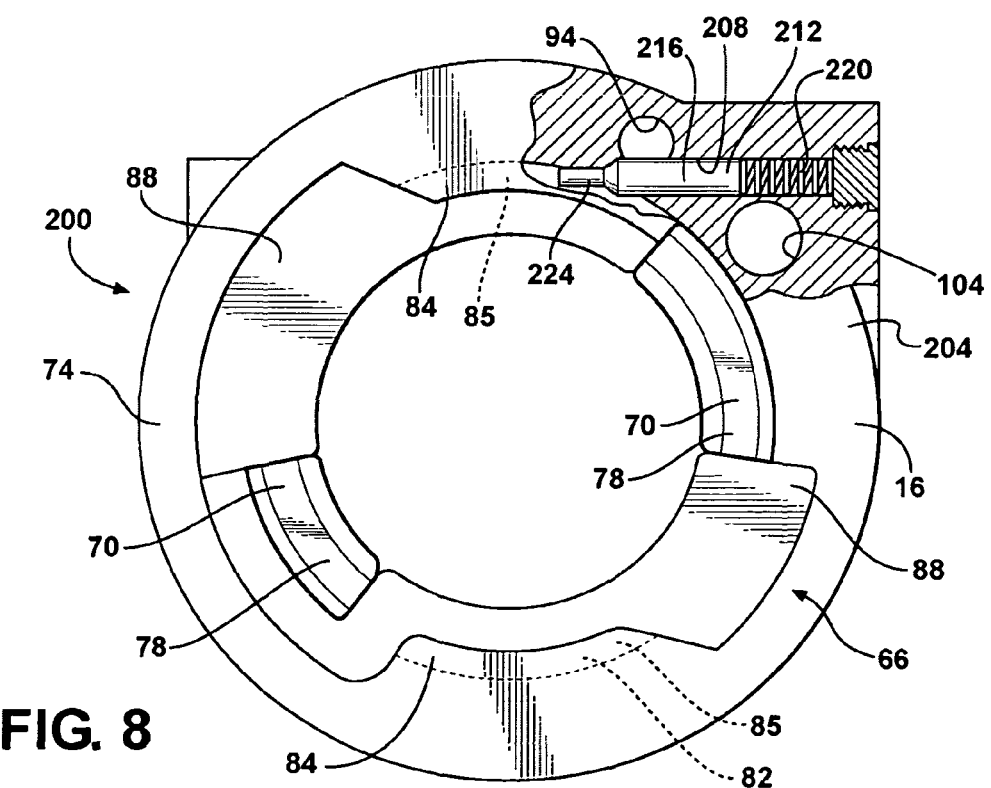
FIG. 8 is a schematic, partial cut-away side view of an alternative coupling in accordance with the claimed invention.

Referring to FIG. 8, wherein like reference numbers refer to like components from FIGS. 1-7, a coupling 200 having an alternative interlock configuration is schematically depicted. The coupling 200 is substantially identical to the coupling shown at 10 in FIGS. 1-7, except that the body 204 of coupling 200 does not include the hole and pin shown at 98 and 212, respectively, in FIGS. 6 and 7. Instead, body 204 defines a hole 208 that extends perpendicularly to holes 94, 104. Hole 208 opens to one of the grooves 82 defined by one of the lips 84. A pin 212 is positioned within the hole 208 and is selectively translatable therein.

Hole 208 partially intersects hole 94, which contains pin 108 (not shown in FIG. 8), such that a wide portion 216 of the pin 212 is contained within the groove defined by segments 140C, 140D, 140E of pin 108, thereby preventing movement of the pin 108, and, therefore, movement of the valve. A spring 220 biases the pin 212 such that the tip of the pin 212 is within the slot 85 and in the pathway of one of the projections (shown at 70A in FIG. 5) of coupling 10A when coupling 10A is engaged with coupling 200. As one of the projections 70A rotates through the groove 82 during engagement, the projection 70A urges the pin 212 further into hole 208, overcoming the bias of the spring 216. When coupling 10A is fully engaged with coupling 200, projection 70A has caused movement of pin 212 such that a narrow portion 224 of the pin 212 is aligned with hole 94. The narrow portion 224 is sufficiently narrow not to interfere with pin 108, and thus pin 108, and, correspondingly, the valve 26, is free to move.

While the best modes for carrying out the invention have been described in detail, those familiar with the art to which this invention relates will recognize various alternative designs and embodiments for practicing the invention within the scope of the appended claims.

The invention claimed is:

1. A fluid coupling comprising:
    a body defining a passageway;
    a valve member being selectively movable between a closed position in which the valve member obstructs the passageway and an open position in which the valve member does not obstruct the passageway;
    an interface at which the body is connectable to a complementary coupling; and
    an interlock system that permits movement of the valve member from the closed position to the open position when the complementary coupling is connected to the body at the interface, and that prevents movement of the valve member from the closed position to the open position when the complementary coupling is not connected to the body at the interface;
    wherein the valve member is a ball valve defining a bore therethrough;
    wherein the bore is aligned with the passageway when the valve member is in the open position;
    wherein the interface includes a sealing surface;
    wherein the body defines a first hole open at the sealing surface;
    wherein the fluid coupling further comprises a pin being selectively movable within the first hole between a retracted position and an extended position;
    wherein the pin extends farther outward from the first hole in the extended position than in the retracted position;
    wherein the pin is operatively connected to the valve member such that the pin is in the extended position when the valve member is in the open position, and the pin is in the retracted position when the valve member is in the closed position;
    wherein the body defines a second hole;
    wherein the interlock system includes an interlock member that is selectively movable within the second hole between a first position and a second position;
    wherein the interlock member is biased in the first position; and
    wherein the interlock member is positioned with respect to the interface such that the complementary coupling maintains the interlock member in the second position when the complementary coupling is engaged with the interface.

2. The fluid coupling of claim 1, wherein the interlock member defines a first groove;

wherein the pin defines a second groove;
wherein the body defines an opening between the first and second holes; and
wherein the coupling further includes a locking member disposed within the opening.

3. The fluid coupling of claim 2, wherein the interlock member is configured such that the first groove is aligned with the opening to receive at least a portion of the locking member when the interlock member is in the second position; and
wherein the interlock member is configured such that the first groove is not aligned with the opening to receive at least a portion of the locking member when the interlock member is in the first position.

4. The fluid coupling of claim 3, wherein the pin is configured such that the second groove is aligned with the opening to receive at least a portion of the locking member when the pin is in the retracted position; and
wherein the pin is configured such that the second groove is not aligned with the opening to receive at least a portion of the locking member when the pin is in the extended position.

5. The fluid coupling of claim 4, wherein movement of the interlock member between the first and second positions is parallel to movement of the pin between the extended and retracted positions.

6. The fluid coupling of claim 1, wherein movement of the interlock member between the first and second positions is perpendicular to movement of the pin between the extended and retracted positions.

7. The fluid coupling of claim 6, wherein the interface includes a lip defining a slot; and wherein the interlock member extends into the slot when in the first position.

8. A fluid coupling comprising:
a body defining a passageway;
a valve member being selectively movable between a closed position in which the valve member obstructs the passageway and an open position in which the valve member does not obstruct the passageway;
an interface at which the body is connectable to a complementary coupling; and
an interlock system that permits movement of the valve member from the closed position to the open position when the complementary coupling is connected to the body at the interface, and that prevents movement of the valve member from the closed position to the open position when the complementary coupling is not connected to the body at the interface;
wherein the interface includes first and second projections, a first arcuate slot having a first enlarged opening, and a second arcuate slot have a second enlarged opening;
wherein the valve member is a ball valve defining a bore therethrough;
wherein the ball valve is selectively rotatable between the open and closed positions;
wherein the fluid coupling further comprises an actuator having a handle that is operatively connected to the ball valve for rotation therewith;
wherein the interface includes a sealing surface;
wherein the body defines a first hole open at the sealing surface;
wherein the fluid coupling further comprises a pin being selectively movable within the first hole between a retracted position and an extended position;
wherein the pin extends farther outward from the first hole in the extended position than in the retracted position;
wherein the pin is operatively connected to the valve member such that the pin is in the extended position when the valve member is in the open position, and the pin is in the retracted position when the valve member is in the closed position;
wherein the pin defines a plurality of teeth; and
wherein the actuator includes at least a portion of gear in meshing engagement with said plurality of teeth such that rotation of the actuator causes translation of the pin.

9. The fluid coupling of claim 8, wherein the body defines a second hole;
wherein the interlock system includes an interlock member that is selectively movable within the second hole between a first position and a second position;
wherein the interlock member is biased in the first position;
wherein the interlock member is positioned with respect to the interface such that the complementary coupling maintains the interlock member in the second position when the complementary coupling is engaged with the interface.

10. The fluid coupling of claim 9, wherein the interlock member defines a first groove;
wherein the pin defines a second groove;
wherein the body defines an opening between the first and second holes; and
wherein the coupling further includes a locking member disposed within the opening.

11. The fluid coupling of claim 10, wherein the interlock member is configured such that the first groove is aligned with the opening to receive at least a portion of the locking member when the interlock member is in the second position; and
wherein the interlock member is configured such that the first groove is not aligned with the opening to receive at least a portion of the locking member when the interlock member is in the first position.

* * * * *